(12) United States Patent
Dee et al.

(10) Patent No.: US 7,933,927 B2
(45) Date of Patent: Apr. 26, 2011

(54) METHOD AND APPARATUS FOR BUILDING INDEX OF SOURCE DATA

(75) Inventors: Stanley J Dee, Austin, TX (US);
Michael S Murley, Austin, TX (US);
William J Pothoff, Austin, TX (US)

(73) Assignee: BMC Software, Inc., Houston, TX (US)

( * ) Notice: Subject to any disclaimer, the term of this patent is extended or adjusted under 35 U.S.C. 154(b) by 1739 days.

(21) Appl. No.: 10/990,609

(22) Filed: Nov. 17, 2004

(65) Prior Publication Data

US 2006/0106860 A1    May 18, 2006

(51) Int. Cl.
*G06F 17/30* (2006.01)

(52) U.S. Cl. ........ 707/802; 707/741; 707/796; 707/803; 707/830; 707/E17.014; 707/E17.019; 707/E17.032; 707/E17.049; 707/999.1; 707/999.102

(58) Field of Classification Search .................. 707/102, 707/104.1
See application file for complete search history.

(56) References Cited

U.S. PATENT DOCUMENTS 5,603,024 A * 2/1997 Goldring ........................ 707/203
6,618,794 B1 * 9/2003 Sicola et al. ................... 711/154

* cited by examiner

*Primary Examiner* — Don Wong
*Assistant Examiner* — Andalib F Lodhi
(74) *Attorney, Agent, or Firm* — Wong, Cabello, Lutsch, Rutherford & Brucculeri, L.L.P.

(57) ABSTRACT

An online index building operation is disclosed for building an index from source data with minimal loss of availability to the source data. The source data can be maintained in a relational database system, such as in a tablespace of a DB2® environment. The disclosed operation creates a consistent image of the source data as of a point-in-time and creates an index from the consistent image. Then, the disclosed operation repeats the acts of making the image consistent as of a subsequent point-in-time and updating the index to reflect the subsequent consistent image until substantially caught up with the current changes to the source data. If not caught up, the disclosed operation continues unless it is falling behind at which point the operation terminates. If it is caught up, the disclosed operation locks access to the source data, updates the image to reflect any final changes, updates the index, and allows access to the index.

54 Claims, 3 Drawing Sheets

METHOD AND APPARATUS FOR BUILDING INDEX OF SOURCE DATA

FIELD OF THE INVENTION

The subject matter of the present disclosure generally relates to a database system and, more particularly but not by way of limitation, to methods and apparatus for building an index of source data in a relational database system.

BACKGROUND OF THE INVENTION

Fundamentally, a database is a computerized record-keeping system in which large amounts of information may be stored in a structured manner for ease of subsequent retrieval and processing. Large databases are generally managed through data base management systems (DBMS's). A DBMS provides an operational environment through which a user may retrieve or update previously stored information. In one type of DBMS, referred to as a relational database system, information is stored in tables, with each table having one or more columns and one or more rows. One well-known example of a relational database system is the DB2® database environment. (DB2 is a registered trademark of International Business Machines Corporation of Armonk, N.Y.). Within a DB2 environment, database tables are created within a tablespace, which can be simple, segmented, or partitioned.

Databases may be characterized as comprising two types of "objects"—data objects and index objects. Both data and index objects are typically embodied as files stored on one or more direct access storage devices (DASDs). Index objects are typically stored in an index. The index is used to search information in tables because scanning an index can be more efficient than scanning an entire table for information. As is known, an index includes a set of pointers that are logically ordered by the values of a key. An index key is the set of columns in a table used to determine the order of index entries. Thus, each entry of an index typically has an index key or search-key value and a pointer to the row of the table containing that value.

In a database environment, there are a number of reasons why a user may wish to create or rebuild an index. In one reason, temporary indexes may be created to support specific processing needs, such as batch processing. Currently, the user may enforce read only access to the source data while the temporary indexes are being built. Alternatively, the user may never drop indexes so that an overhead of updates must be maintained in the database environment.

In another reason, existing indexes may be deleted to provide faster loading of data with a LOAD utility. This is more common with a LOAD RESUME operation. Consequently, indexes must be rebuilt after the load. Currently, the user may enforce read only access to the source data while new indexes are being built. Alternatively, the user may use an operation to do partial rebuilds. One example of such an operation for partial rebuilds is the LOAD RESUME SHRLEVEL CHANGE operation available in the LOADPLUS utility from BMC Software, Inc.

Large databases can have hundreds of gigabytes to tens of terabytes of information so that the time required to build an index can be significant. Therefore, enforcing read only access to source data can be particularly undesirable due to the amount of time required to build an index. Thus, it would be beneficial to provide a technique to build an index for a database that is more time efficient than current techniques.

The subject matter of the present disclosure is directed to overcoming, or at least reducing the effects of, one or more of the problems set forth above.

SUMMARY OF THE DISCLOSURE

Methods and apparatus of an operation are disclosed for building an index from source data. The disclosed operation creates a consistent image of the source data as of a point-in-time and creates an index from the consistent image. Then, the disclosed operation repeats the acts of making the image consistent as of a subsequent point-in-time and updating the index to reflect the subsequent consistent image until a defined event occurs (e.g., until the index is substantially caught up with the current changes to the source data). In one embodiment, the disclosed operation is deemed to be "caught up" when the number of current changes for updating the image is small enough such that any outage from locking access to the source data and updating the image with the current changes would be less than a defined amount of time. If not caught up, the disclosed operation repeats the acts of identifying changes to the source data, updating the image, and updating the index unless the disclosed operation determines that it is falling behind. In one embodiment, the disclosed operation determines that it is falling behind if the number of current changes to process is greater than the number of changes previously processed. If falling behind, the disclosed operation terminates. If it is caught up, however, the disclosed operation locks access to the source data, updates the image to reflect any final changes, updates the index, and finally allows access to the index.

The foregoing summary is not intended to summarize each disclosed or potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
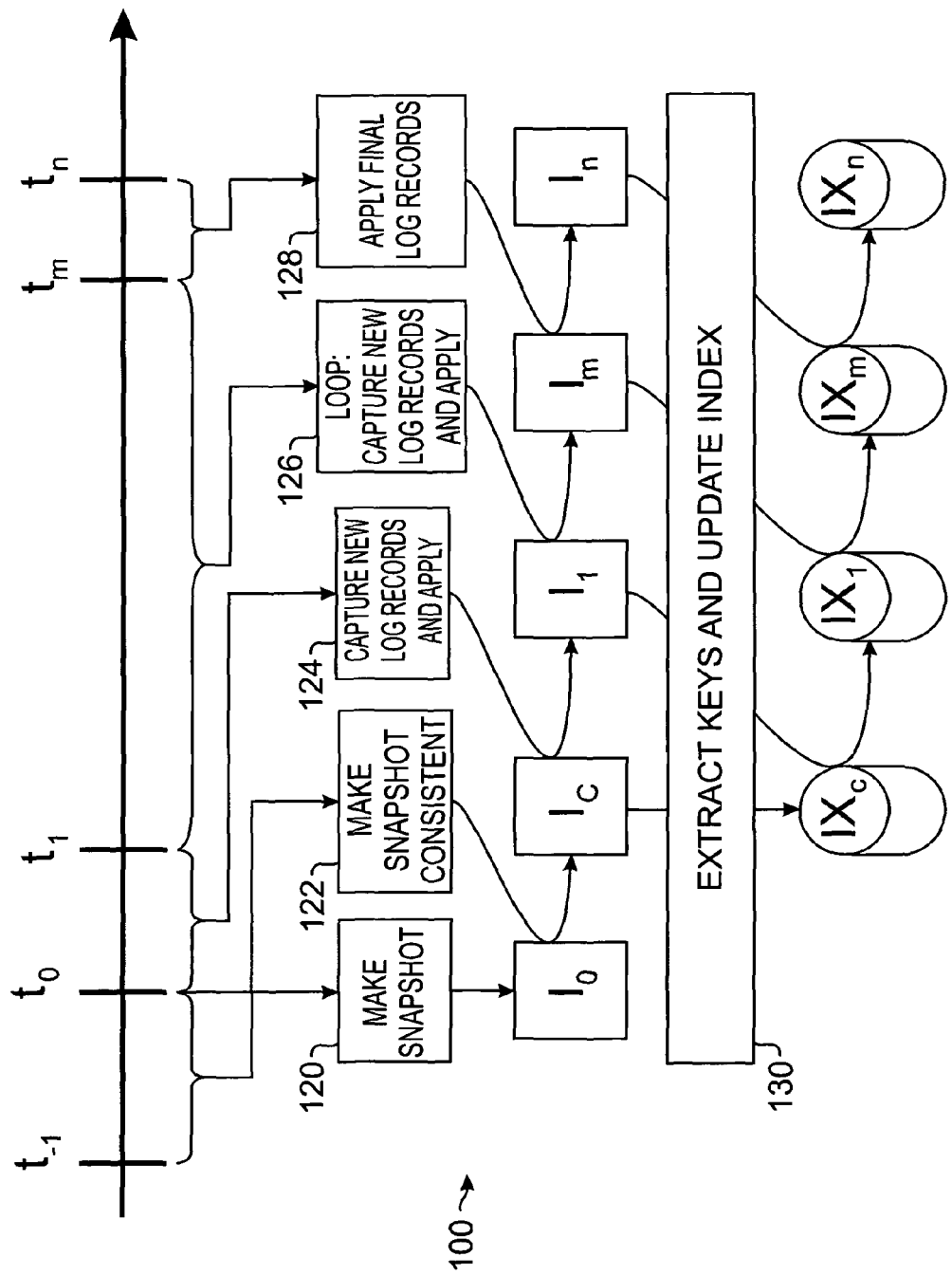
FIG. 1 illustrates a timeline diagramming an operation according to certain teachings of the present disclosure for building an index from source data with minimal loss of availability to the source data.

While the disclosed operation for building of an index is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Referring to FIG. 1, a timeline diagrams phases of an online index building operation 100 according to certain teachings of the present disclosure. The disclosed operation 100 builds an index IX from source data (not shown) while remaining online, with respect to users of the database, with minimal loss of availability to the source data. The source data can be maintained in a relational database system, such as in a DB2® environment. The disclosed operation 100 is initiated at time $t_0$ at which point the operation 100 in a first consistency phase 120 makes a snapshot image $I_0$ of the source data. As used herein, an image is a replica of the source data, which can be a tablespace in a DB2® environment. In a preferred embodiment discussed in more detail below, the disclosed operation 100 makes a SHRLEVEL CHANGE instant snapshot image of the source data. The snapshot image $I_0$ is used to build an index IX of the source data, while user's access to the original source data remains available. Accordingly, users may execute read and write operations on the original source data while the disclosed operation 100 builds the index IX.

Because the snapshot image $I_0$ is made at a specific point-in-time $t_0$, the snapshot image $I_0$ reflects how the source data existed on the storage device(s) at that time $t_0$. Thus, the image $I_0$ may contain uncommitted changes to the source data, and the image $I_0$ may not contain committed changes if such changes still reside in a buffer pool storage (not shown) associated with the DBMS. Accordingly, the disclosed operation 100 in a second consistency phase 122 makes the snapshot image $I_0$ consistent or up-to-date to produce a consistent image $I_C$. Because the consistent image $I_C$ is made from the snapshot image $I_0$, access to the original source data is not disturbed during this second consistency phase 122. As used herein, a consistent image is an image that contains all committed data and does not contain any uncommitted data. In a preferred embodiment disclosed in more detail below for making the consistent image $I_C$, the disclosed operation 100 uses log records to externalize changes to the snapshot image $I_0$ for all complete transactions and to back out changes in the snapshot image $I_0$ for any in-flight transactions, which is described in more detail below.

Moving to a building phase 130, the disclosed operation 100 extracts index keys from the consistent image $I_C$ and creates a consistent index $IX_C$ with the extracted keys and pointers to the original source data. The consistent index $IX_C$, however, may not be truly up-to-date as of the time when it is built, because a number of updates may have occurred between the time $t_0$ when the snapshot was made to the time when the index $IX_C$ is built. Accordingly, in a third consistency phase 124, a log-reading task detects new log records of updates intended for the source data from time $t_0$ to some subsequent time $t_1$. As is known, the DBMS typically maintains a log, which is a collection of records describing events that occur during execution of the DBMS and the sequences of those events. The information recorded in such as log is typically used for recovery in the event of a failure during execution.

The disclosed operation obtains new log records of updates or changes to the source data and applies the updates or changes to the consistent image $I_C$ to produce a more consistent image $I_1$ of the source data as of the subsequent time $t_1$. It will be recognized that determining any time intervals (e.g., time $t_0$ to some subsequent time $t_1$) for the disclosed operation can involve timestamps or log record sequence numbers so that the exact implementation technique is a matter of design choice. In the building phase 130, the disclosed operation 100 again extracts keys from the current image $I_1$ and generates corresponding index updates to produce a more current index $IX_1$ of the source data.

In a looped execution of consistency phase 126 and building phase 130, the disclosed operation 100 captures new log records between time intervals, applies them to the consistent image $I_m$, extracts keys, and updates the index $IX_m$. When the backlog of log records requiring updates to the index $IX_m$ becomes small enough or some other defined event occurs, the disclosed operation 100 locks access to the source data in a final consistency phase 128. The disclosed operation 100 applies any final log records from time period $t_m$ to $t_n$ to the most current image $I_m$, extracts keys, and updates the current index $IX_m$ to produce a final updated index $IX_n$.

Figure 2:
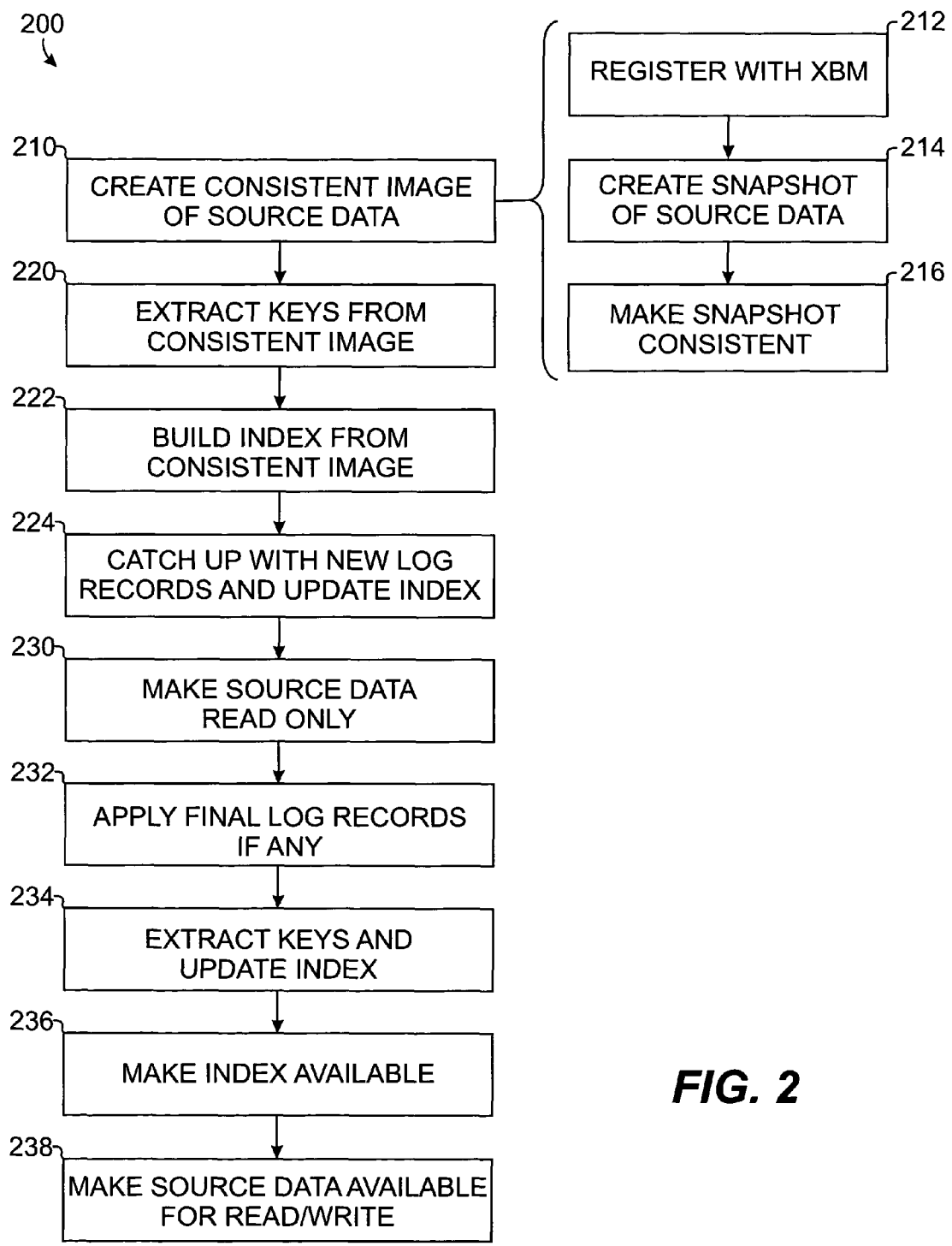
FIG. 2 illustrates a flowchart diagramming acts of the disclosed operation for building an index from source data with minimal loss of availability to the source data.
Figure 3:
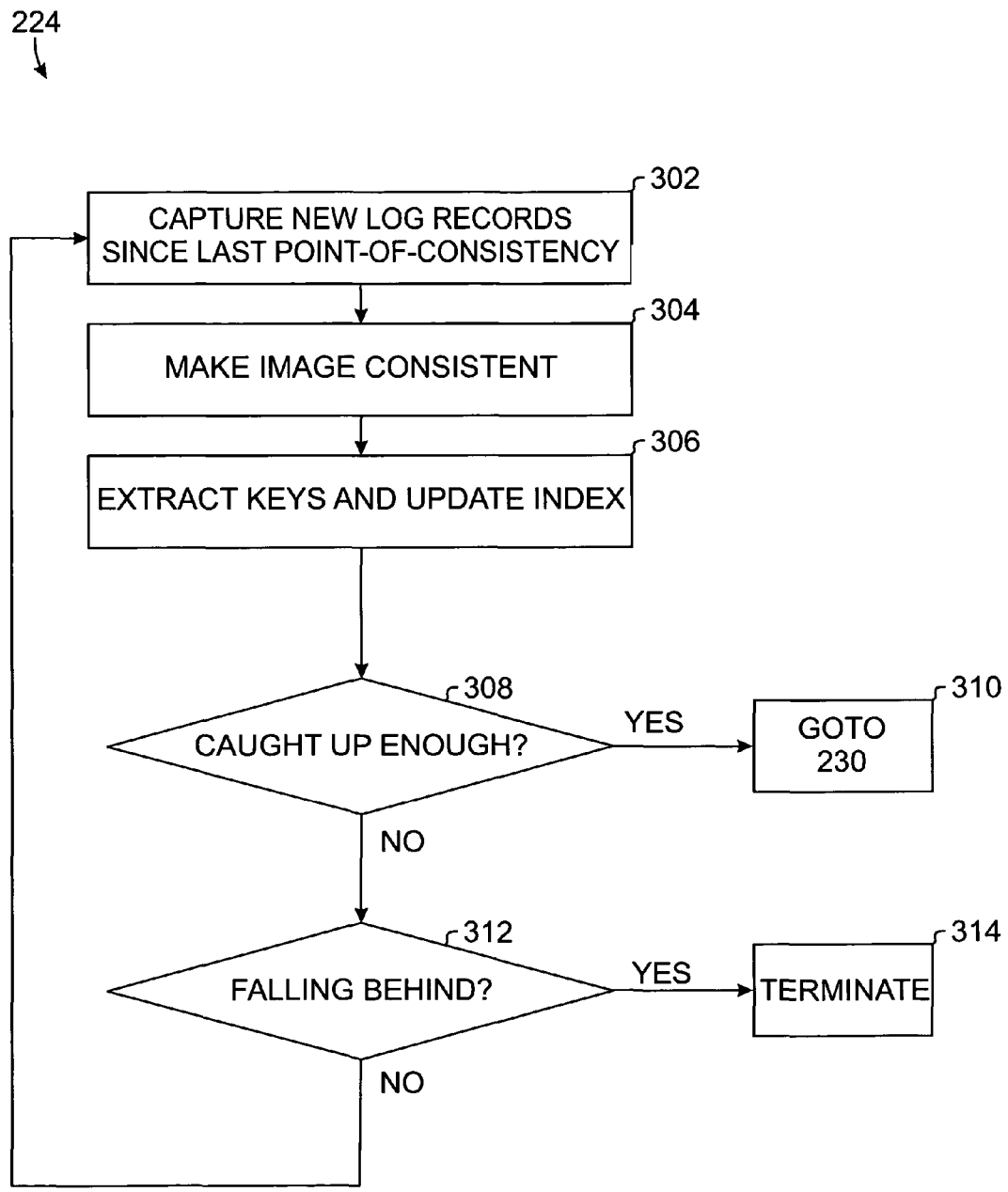
FIG. 3 illustrates a flowchart detailing portions of the flowchart in FIG. 2.

Given the discussion of the timeline of the disclosed operation 100 and the various phases that the operation performs along the timeline, more detailed description of the acts of the disclosed operation 100 will be provided with reference to FIGS. 2 and 3. In FIG. 2, a flowchart diagrams acts 200 of the disclosed operation for building an index of source data with minimal loss of user availability to the source data. The disclosed operation first creates a consistent image of the source data when an index is to be built for the source data (Block 210). To build the consistent image, the disclosed operation preferably registers with an Extended Buffer Manager (XBM), which is a BMC Software product and is described in more detail below (Block 212). Then, the disclosed operation creates a snapshot image of the source data (Block 214).

In one embodiment for creating the snapshot image, the disclosed operation uses techniques disclosed in U.S. Pat. No. 6,202,136, entitled "Method of Creating an Internally Consistent Copy of an Actively Updated Data Set Without Specialized Caching Hardware", which is incorporated herein by reference in its entirety. To create the snapshot image, for example, the disclosed operation uses intelligent storage devices because they permit complete copies of a data set in a few seconds, regardless of the size of the objects being copied. The disclosed operation uses XBM to cache data in an extended buffer so that the number of physical read I/Os performed in accessing the data is reduced. Because XBM accepts only read requests, a read request for the data stored in the extended buffer can be satisfied without performing a physical I/O to read the data from the appropriate direct access storage devices (DASD). All writes are performed directly to the DASD. As updates are written to the DASD, XBM updates the data it manages in the extended buffer so that integrity of the data is maintained.

When creating the snapshot image, the disclosed operation monitors any WRITE requests issued by a data-writing program that is accessing the source data (e.g., for updating the source data). In addition, the disclosed operation monitors any READ requests issued by a data-reading program that is accessing the source data (e.g., for copying from the source data). While a series of READ requests (e.g., a copying operation) is in progress, the disclosed operation monitors all WRITE requests issued for the relevant data by the data-writing program. If the data-reading program has not yet read the data portion (e.g., a data page) that is to be updated, the disclosed operation selectively creates a cached image of the data portion as it existed at the beginning of the series of READ requests and delivers the cached image to the data-reading program. Delivering the cached image reduces the potential for internal inconsistencies in the copied data.

One illustrative application that makes use of intelligent storage devices and which is suitable for use with the disclosed operation is the SNAPSHOT UPGRADE FEATURE for DB2® by BMC Software, Inc. In a DB2 environment, for example, the snapshot image created is a SHRLEVEL CHANGE snapshot. Whatever technique is used to create the snapshot image of the source data, the snapshot image must be of a type against which DBMS log records may be applied. It will be recognized by one skilled in the art that such a snapshot image may be created in one step (e.g., through the use of intelligent storage devices), or it may be generated in a series of steps, only the last one of which creates a copy against which database log file entries may be applied.

Once the snapshot image is made, the disclosed operation uses XBM caching techniques and Online Consistent Copy techniques to make the snapshot image consistent as of the point-in-time that the snapshot image was made (Block 216). Making the consistent image can be done without outage (i.e., without denying access to the source data). To make the consistent image, the disclosed operation preferably uses techniques disclosed in U.S. patent application Ser. No. 10/723,677, filed Nov. 26, 2003 and entitled "Unobtrusive Point-in-time Consistent Copies" by Michael S. Murley et al., which is incorporated herein by reference in its entirety.

In one technique for making the snapshot image consistent, the disclosed operation initially uses DBMS log records to identify changes made to the source data that are not yet reflected in external storage and, therefore, not yet reflected in the snapshot image. Identified changes (committed and uncommitted) are then externalized to the snapshot image. It is noted that, because log records are applied directly against the snapshot image, there is no interference with the source data.

In addition, the disclosed operation initially uses DBMS log records to identify any in-flight units-of-work (UOW) as of the time the snapshot image was completed. A UOW is a group of database updates related to a single logical transaction. Those updates to the source data (and hence the snapshot image) that are associated with in-flight transactions/UOWs are removed from the snapshot image. The in-flight UOWs are removed from the snapshot image because each UOW may begin and end at a different time (recall, a UOW is a group of database updates related to a single logical transaction). If, for example, the snapshot has been created at a time $t_0$, then some UOWs may still be "in-flight" so that some updates associated with the UOW may have been made while others may have not be made by time $t_0$. To make the copy transactionally consistent as of the time $t_0$ of the snapshot, it is necessary to remove or back-out those updates associated with the UOWs made prior to that time $t_0$. To maintain physical consistency, however, those updates associated with structural changes to the source data are not backed-out even if the update that necessitated the structural change was backed-out. For example, space allocation updates are not removed even if the change that triggered the structural update was removed. An illustrative structural change is an index page split.

Once a consistent image of the source data is made, the disclosed operation extracts index keys from every page of the consistent image (Block 220) and builds an index for the consistent image (Block 222). To extract the index keys and build the index, the disclosed operation can use a RECOVER utility. For a DB2 environment, for example, the disclosed operation preferably uses BMC Software's "RECOVER PLUS" Technology, which is similar to the IBM DB2® RECOVER utility.

The disclosed operation then catches up with new log records of changes made to the source data, updates the consistent image with the new log records, and updates the index accordingly in a looped execution (Block 224), which is shown in more detail in FIG. 3. In this way, the index can be made consistent or up-to-data as of subsequent points-in-time. When the updates to the index are substantially caught up, the disclosed operation makes the source data read only using a DB2® command, for example (Block 230). The disclosed operation then applies any final transactions from the log records to the consistent image (Block 232). The disclosed operation extracts keys from the more consistent image and updates the index accordingly (Block 234). Finally, the disclosed operation makes the index available (Block 236) and makes the source data read/write accessible (Block 238). From this point, the index is consistent with the original source data, and the index can be used for searching. Any updates to the source data can be implemented in the index according to techniques known in the art.

As noted above, the disclosed operation uses log records to update the consistent image and the index in a looped execution of Block 224. Referring to Figure CC, the acts of catching up with the new log records and updating the consistent image and index involved in the looped execution 224 of the disclosed operation are illustrated in flowchart form. From the beginning when the snapshot image is made, the disclosed operation obtains new log records for the source data that have occurred since the last point-of-consistency (i.e., the last time the image was made consistent and the index was updated) (Block 302). Log records may be automatically generated as a matter of course to a DB2system log. The disclosed operation can obtain those log records that are relevant to the source data by preferably using asynchronous capture techniques known in the art. The disclosed operation may capture a predetermined amount of log records or may capture log records for a predetermined amount of time before moving to subsequent acts.

During the looped execution 224, the disclosed operation continues to use the XBM caching techniques and Online Consistent Copy techniques discussed above to make the image consistent as of subsequent points-in-time. When new log records are obtained, the disclosed operation makes the image consistent as of the subsequent point-in-time by applying the transactions recorded by the new log records to the data objects of the currently consistent image (Block 304). The disclosed operation extracts keys from the more consistent image and updates the index accordingly (Block 306). As one skilled in the art will appreciate, updating the index involves inserting keys into the index, which is generally stored in a B-tree format. Therefore, algorithms known to those skilled in the art can be used for inserting a key as a leaf into the index.

During the looped execution 224, the disclosed operation determines whether the operation has updated the index enough to adequately reflect the source data, which was originally targeted and has also been subsequently updated (Block 308). If the updated index adequately reflects the original source data, the operation can finalize the index and use the index for searching and the like. Determining whether the operation is caught up enough can be based on various parameters, such as the current activity of the database environment, a predetermined threshold, a running average of log records over time, the type (simple, segmented, or partitioned) of tablespace containing the source data, etc. In one embodiment, for example, the disclosed operation determines whether there is a small enough number of new log records for updating the consistent image such that any outage caused by locking the source data would be less than a desired amount of time, such as about two seconds. The actual desired amount of time is a matter of design choice. If the index copy is substantially caught up, the disclosed operation goes to Block 230 of FIG. 2 to finalize the index (Block 310). Otherwise, the disclosed operation can continue its looped execution 224 and return to Block 302 to continue capturing log records, applying them to the image, extracting keys, and updating the index.

Preferably, the disclosed operation includes instructions for quitting the looped execution 224 under certain circumstances to prevent infinite looping or fruitless execution of the disclosed operation. The quit instructions may limit the looped execution 224 to a particular amount of time or a set number of looped executions. In a preferred embodiment, the disclosed operation determines whether the operation is falling behind if the operation is not caught up in Block 308 (Block 312). This determination can also be based on various parameters, such as the current activity of the database environment, a predetermined threshold, a running average of log records over time, the type (simple, segmented, or partitioned) of tablespace containing the source data, etc. In one embodiment, for example, the determination is based on whether the number of updates to process (e.g., new log records) is greater than the number previously processed. Comparing the number of updates in this manner may be more applicable when the time frames in which subsequent updates are performed is substantially equal to previous time frames. In another embodiment, therefore, the determination can be based on whether the average number of updates over time to currently process is greater than the average number of updates over time previously processed. The determination of Block 312 can be implemented in conjunction with the determination of Block 308 and is shown separately for convenience.

If it is falling behind (e.g., the number or average over time of current updates is greater than the number or average over time of updates processed in the most recently completed update operation.), the disclosed operation fails and terminates (Block 314). Failure may occur, for example, if there has been a disadvantageous increase in activity (e.g., write access) to the source data in the database environment while building the index. If it is not falling behind, however, the disclosed operation returns to Block 302 to continue capturing log records, applying them to the image, extracting keys, and updating the index.

The present disclosure amply illustrates to a computer programmer of skill how to make and use the disclosed operation for building of an index. Therefore, programming the disclosed operation is a routine matter to a computer programmer of skill and can be accomplished using many different programming languages and within the context of many different operating systems. Of course, the disclosed techniques would be ultimately coded into a computer code and stored on a computer-readable media, such as a compact disk, a tape, stored in a volatile or non-volatile memory, etc.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An index building method, comprising:
   creating a snapshot image of source data at a point-in-time;
   making the snapshot image consistent with the source data as of the point-in-time;
   creating the index from the consistent image;
   making the consistent image consistent with the source data as of a subsequent point-in-time; and
   updating the index to reflect the subsequent consistent image.

2. The method of claim 1, wherein the act of creating the snapshot image of the source data at the point-in-time comprises creating the snapshot image in a manner that does not substantially block access to the source data.

3. The method of claim 1, wherein the act of making the snapshot consistent with the source data as of the point-in-time comprises:
   identifying one or more changes to the source data as of the point-in-time; and
   updating the snapshot image to reflect the identified changes.

4. The method of claim 3, wherein the acts of identifying, updating and creating are repeated during a single index building operation.

5. The method of claim 3, wherein the acts of identifying the one or more changes and updating the snapshot image further comprises:
   identifying the one or more changes to the source data as of the point-in-time that do not exist in the image;
   updating the snapshot image to reflect the identified changes; and
   removing all updates from the snapshot image made after the point-in-time.

6. The method of claim 5, wherein the acts of identifying the one or more changes and updating the snapshot image further comprises:
   identifying one or more in-flight units-of-work associated with the updates to the source data as of the point-in-time; and
   removing each of the updates associated with each identified in-flight unit-of-work from the snapshot image.

7. The method of claim 1, wherein the act of making the image consistent comprises obtaining one or more log records from a database management system log.

8. The method of claim 1, wherein the act of making the image consistent comprises asynchronously capturing one or more log records associated with the source data.

9. The method of claim 1, wherein the act of creating the index from the updated image comprises:
   extracting one or more index keys from the consistent image; and
   creating the index using the extracted index keys.

10. The method of claim 1, further comprising determining whether the index substantially reflects the source data as of a current point-of-time such that any outage from locking access to the source data and updating the image with current changes would be less than a defined amount of time.

11. The method of claim 1, wherein the act of making the consistent image consistent with the source data as of the subsequent point-in-time comprises:
    identifying one or more changes to the source data as of the point-in-time; and
    updating the consistent image to reflect the identified changes.

12. The method of claim 11, further comprising repeating the acts of identifying changes, updating the image, and updating the index until a defined event occurs.

13. The method of claim 12, further comprising allowing access to the index if the defined event occurs and terminating if the defined event does not occur.

14. The method of claim 12, wherein the defined event includes a point when a number of current changes for updating the image is small enough such that any outage from locking access to the source data and updating the image with the current changes would be less than a defined amount of time.

15. The method of claim 14, further comprising if the current number of changes for updating the image is small enough:
  blocking access to the source data;
  updating the image to reflect the current changes;
  updating the index to reflect the updated image; and
  allowing access to the updated index.

16. The method of claim 12, wherein the defined event includes a point when a number of current changes to process is greater than a number of changes previously processed.

17. The method of claim 16, further comprising terminating if the number of current changes to process is greater than the number previously processed.

18. A computer-readable medium having instructions to perform an index building method implementable on a programmable control device, the method comprising:
  creating a snapshot image of source data at a point-in-time;
  making the snapshot image consistent with the source data as of the point-in-time;
  creating the index from the consistent image;
  making the consistent image consistent with the source data as of a subsequent point-in-time; and
  updating the index to reflect the subsequent consistent image.

19. The method of claim 18, wherein the acts of identifying, updating and creating are repeated during a single index building operation.

20. The method of claim 18, wherein the act of making the snapshot consistent with the source data as of the point-in-time comprises:
  identifying one or more changes to the source data as of the point-in-time; and
  updating the snapshot image to reflect the identified changes.

21. The method of claim 20, wherein the act of creating the snapshot image of the source data at the point-in-time comprises creating the snapshot image in a manner that does not substantially block access to the source data.

22. The method of claim 20, wherein the acts of identifying the one or more changes and updating the snapshot image further comprises:
  identifying the one or more changes to the source data as of the point-in-time that do not exist in the image;
  updating the snapshot image to reflect the identified changes; and
  removing all updates from the snapshot image made after the point-in-time.

23. The method of claim 22, wherein the acts of identifying the one or more changes and updating the snapshot image further comprises:
  identifying one or more in-flight units-of-work associated with the updates to the source data as of the point-in-time; and
  removing each of the updates associated with each identified in-flight unit-of-work from the snapshot image.

24. The method of claim 18, wherein the act of making image consistent comprises obtaining one or more log records from a database management system log.

25. The method of claim 18, wherein the act of making the image consistent comprises asynchronously capturing one or more log records associated with the source data.

26. The method of claim 18, wherein the act of creating the index from the updated image comprises:
  extracting one or more index keys from the consistent image; and
  creating the index using the extracted index keys.

27. The method of claim 18, further comprising determining whether the index substantially reflects the source data as of a current point-of-time such that any outage from locking access to the source data and updating the image with current changes would be less than a defined amount of time.

28. The method of claim 18, wherein the act of making the consistent image consistent with the source data as of the subsequent point-in-time comprises:
  identifying one or more changes to the source data as of the point-in-time; and
  updating the consistent image to reflect the identified changes.

29. The method of claim 28, further comprising repeating the acts of identifying changes, updating the image, and updating the index until a defined event occurs.

30. The method of claim 29, further comprising allowing access to the index if the defined event occurs and terminating if the defined event does not occur.

31. The method of claim 29, wherein the defined event includes a point when a number of current changes for updating the image is small enough such that any outage from locking access to the source data and updating the image with the current changes would be less than a defined amount of time.

32. The method of claim 31, further comprising if the current number of changes for updating the image is small enough:
  locking access to the source data;
  updating the image to reflect the current changes;
  updating the index to reflect the updated image; and
  allowing access to the updated index.

33. The method of claim 29, wherein the defined event includes a point when a number of current changes to process is greater than a number of changes previously processed.

34. The method of claim 33, further comprising terminating if the number of current changes to process is greater than the number previously processed.

35. An index building method, comprising:
  creating a consistent image of source data as of a point-in-time;
  creating an index from the consistent image; and
  repeating acts of making the image consistent as of a subsequent point-in-time and updating the index to reflect the subsequent consistent image until a defined event occurs.

36. The method of claim 35, wherein the act of creating the consistent image of the source data as of the point-in-time comprises creating the consistent image in a manner that does not substantially block access to the source data.

37. The method of claim 35, wherein the act of creating the consistent image of the source data as of the point-in-time further comprises:
  creating a snapshot image of the source data at the point-in-time;
  identifying one or more changes to the source data as of the point-in-time that do not exist in the image;
  updating the snapshot image to reflect the identified changes; and
  removing all updates from the snapshot image made after the point-in-time.

38. The method of claim 37, wherein the act of creating the consistent image of the source data as of the point-in-time further comprises:
  identifying one or more in-flight units of work associated with the updates to the source data as of the point-in-time; and removing each update associated with each identified in-flight unit of work from the snapshot image.

39. The method of claim 35, wherein the act of creating the index from the consistent image comprises:
    extracting one or more index keys from the consistent image; and
    creating the index using the extracted index keys.

40. The method of claim 35, further comprising allowing access to the index if the defined event occurs and terminating if the defined event does not occur.

41. The method of claim 35, wherein the defined event includes a point when a number of current changes for updating the image is small enough such that any outage from locking access to the source data and updating the image with the current changes would be less than a defined amount of time.

42. The method of claim 41, further comprising if the current number of changes for updating the image is small enough:
    locking access to the source data;
    updating the image to reflect the current changes;
    updating the index to reflect the updated image; and
    allowing access to the index.

43. The method of claim 35, wherein the defined event includes a point when a number of current changes to process is greater than a number of changes previously processed.

44. The method of claim 43, further comprising terminating if the number of current changes to process is greater than the number previously processed.

45. A computer-readable medium having instructions to perform an index building method implementable on a programmable control device, the method comprising:
    creating a consistent image of source data as of a point-in-time;
    creating an index from the consistent image; and
    repeating acts of making the image consistent as of a subsequent point-in-time and updating the index to reflect the subsequent consistent image until a defined event occurs.

46. The method of claim 45, wherein the act of creating the consistent image of the source data as of the point-in-time comprises creating the consistent image in a manner that does not substantially block access to the source data.

47. The method of claim 45, wherein the act of creating the consistent image of the source data as of the point-in-time further comprises:
    creating a snapshot image of the source data at the point-in-time;
    identifying one or more changes to the source data as of the point-in-time that do not exist in the image;
    updating the snapshot image to reflect the identified changes; and
    removing all updates from the snapshot image made after the point-in-time.

48. The method of claim 47, wherein the act of creating the consistent image of the source data as of the point-in-time further comprises:
    identifying one or more in-flight units of work associated with the updates to the source data as of the point-in-time; and
    removing each update associated with each identified in-flight unit of work from the snapshot image.

49. The method of claim 45, wherein the act of creating the index from the consistent image comprises:
    extracting one or more index keys from the consistent image; and
    creating the index using the extracted index keys.

50. The method of claim 45, further comprising allowing access to the index if the defined event occurs and terminating if the defined event does not occur.

51. The method of claim 45, wherein the defined event includes a point when a number of current changes for updating the image is small enough such that any outage from locking access to the source data and updating the image with the current changes would be less than a defined amount of time.

52. The method of claim 51, further comprising if the current number of changes for updating the image is small enough:
    locking access to the source data;
    updating the image to reflect the current changes;
    updating the index to reflect the updated image; and
    allowing access to the index.

53. The method of claim 45, wherein the defined event includes a point when a number of current changes to process is greater than a number of changes previously processed.

54. The method of claim 53, further comprising terminating if the number of current changes to process is greater than the number previously processed.

* * * * *